United States Patent Office 2,913,475
Patented Nov. 17, 1959

2,913,475

ORGANIC THIOSULFENATES AND METHOD OF PREPARATION

Rector P. Louthan, Bartlesville, Okla., assignor to Phillips Petroleum Company, a corporation of Delaware No Drawing. Application August 1, 1957
Serial No. 675,536

11 Claims. (Cl. 260—456)

This invention relates to certain organic thiosulfenates and to a method for preparation of these compounds. In one aspect, this invention relates to certain organic thiosulfenates as new compounds. In another aspect, the invention relates to a method by which such thiosulfenates can be prepared by reacting a mole of an organic sulfenyl halide with an equivalent weight of certain alcoholates.

An object of the invention is to provide a method for preparing certain organic thiosulfenates. Another object of the invention is to provide a method for preparing alkyl thiosulfenates. A further object of the invention is to provide a method for preparing tertiary alkyl thiosulfenates. Another object of the invention is to provide certain organic thiosulfenates as new compounds.

In accordance with this invention, there is provided a process wherein an organic sulfenyl halide having the formula RSX, wherein R represents an alkyl, aryl, alkaryl, aralkyl, or cycloalkyl radical, and X is chlorine or bromine, is reacted with an alcoholate of the formula $M(OR')_n$, wherein M is an alkali metal radical or an alkaline earth metal radical, $n$ equals the valence of M, and R' is an alkyl, aryl, alkaryl, aralkyl, or cycloalkyl radical, and there is thereby produced as a new compound of the invention, an organic thiosulfenate having the formula R—S—S—O—R'.

Alcoholates applicable in the practice of this invention are the alkali metal and alkaline earth metal alcoholates derived from alcohols of the formula ROH where R is an alkyl, aryl, alkaryl aralkyl, or cycloalkyl radical. Thus, the term alcohol has its broad meaning and is not restricted to the aliphatic alcohols. Particularly suitable in this invention are the saturated aliphatic alcohols of primary, secondary, or tertiary configuration. In the foregoing formula, the alcohols generally have 1 to 20 carbon atoms in the R' group, usually 1 to 8 carbon atoms. Methods of preparing the alcoholates are well known and are not a part of the present invention. For instance, sodium alcoholates are easily prepared by reaction of metallic sodium with the alcohol. If desired, in the preparation of a sodium alcoholate the alcohol can be suspended or dissolved in a suitable inert medium, as is well known.

In the process of the invention any excess alcohol which is not reacted in preparing the alcoholate can be left in admixture with the alcoholate when reacting the latter with the sulfenyl halide according to the invention. On the other hand, if desired, the alcoholate can be isolated before its reaction with the sulfenyl halide.

Examples of alcoholates of the foregoing description include each of the alkali metal and alkaline earth metal alcoholates of each of the following alcohols: methyl alcohol, ethyl alcohol, n-propyl alcohol, isopropyl alcohol, n-butyl alcohol, isobutyl alcohol, tertiary butyl alcohol, n-amyl alcohol tertiary amyl alcohol, heptyl alcohol, n-octyl alcohol, tertiary octyl alcohol, n-nonyl alcohol, n-decyl alcohol, tertiary decyl alcohol, hendecyl alcohol, dodecyl alcohol, tridecyl alcohol, tetradecyl alcohol, pentadecyl alcohol, hexadecyl alcohol, octadecyl alcohol, phenol, ortho-, meta-, and parabutylphenol, parasecondarybutylphenol, paratertiarybutylphenol, ortho-, meta-, and paraethylphenol, ortho-, meta-, and paracresol, orthoisopropylphenol, paraisopropylphenol, cyclohexanol, cyclopentanol, benzyl alcohol, 2-phenyl-2-propanol, 3-methyl-1-phenyl-1-butanol, and 4-phenyl-1-butanol.

In order to effect the reaction according to the invention to obtain the defined organic thiosulfenates of the invention, it is necessary that there be present in the reaction mixture for each gram equivalent weight of the alcoholate at least one gram mole of the sulfenyl halide. If there is to be an excess it must be an excess of the organic sulfenyl halide. There are usually added to the reaction mixture a total of from 1 to 2 gram moles of the sulfenyl halide for each gram equivalent weight of the alcoholate introduced to the total reaction mixture, although at any one instant during the reaction there often is a considerably higher ratio than this range, particularly when the alcoholate is added to the total amount of the sulfenyl halide during the course of the reaction. A gram equivalent weight of the alcoholate is the gram molecular weight divided by the valence of the metal ion. Thus, of course, the gram equivalent weight of the alkali metal alcoholates is the same as the gram molecular weight.

The reaction can conveniently be effected in a reactor equipped with a stirrer and means for controlling and measurement of the temperature. Usual temperatures are within the range from 0 to 150° C., although temperatures outside this range are applicable. The reaction temperature can conveniently be controlled at the boiling point of the solvent by equipping the reactor with a reflux condenser. The pressure of the reaction can be both below and above atmospheric pressure, as well as atmospheric, although it is usually preferred to maintain the reactants in liquid phase. The reaction can be effected batchwise or in a continuous manner.

One convenient method for preparing the defined organic sulfenyl chloride or sulfenyl bromide starting material is to dissolve the corresponding disulfide in about 2 to 10 times its weight of a relatively inert solvent, such as butane, n-pentane, isopentane, hexane, heptane, benzene, toluene, carbon tetrachloride, or chloroform, and then to add gaseous chlorine or bromine in amounts up to one mole for each mole of the disulfide, and effect the reaction while maintaining the temperature in the range from about 50 to 150° F. Following this procedure there is very rapidly formed the corresponding sulfenyl chloride. The sulfenyl chlorides are recovered in high yields when prepared in this manner and can be employed in the subsequent reaction with the alcoholates without recovery from the reaction medium, such as isopentane. The concentration of the sulfenyl chloride in the reaction mixture solvent to be reacted with the alcoholate can conveniently be in the range from 0.5 to 25 weight percent.

The sulfenyl halide reactant of the formula RSX usually contains from 1 to 20 carbon atoms, preferably not more than 12 carbon atoms.

The total carbon atoms in the products of my invention of the formula RSSOR' usually does not exceed 20 carbon atoms.

Examples of the sulfenyl halides of the formula RSX, as defined, include the primary, secondary and tertiary alkyl sulfenyl halides of the following alkyl sulfenyl halides: butyl sulfenyl chloride, butyl sulfeny bromide, amy sulfenyl chloride, amyl sulfenyl bromide, hexyl sulfenyl chloride, hexyl sulfenyl bromide, heptyl sulfenyl chloride, heptyl sulfenyl bromide, octyl sulfenyl chloride, octyl sulfenyl bromide, nonyl sulfenyl chloride, nonyl sufenyl bromide, decyl sulfenyl chloride, decyl sulfenyl bromide, hendecyl sulfenyl chloride, hendecyl sulfenyl bromide, dodecyl sulfenyl chloride, dodecyl sulfenyl bromide, tridecyl sulfenyl chloride, tridecyl sulfenyl bromide, tetradecyl sulfenyl chloride, tetradecyl sulfenyl bromide, pentadecyl sulfenyl chloride, pentadecyl sulfenyl bromide, hexadecyl sulfenyl chloride, hexadecyl sulfenyl bromide, octadecyl sulfenyl chloride, and octadecyl sulfenyl bromide. Other examples of the sulfenyl halide reactant include aromatic sulfenyl halides such as phenyl sulfenyl halide and alkyl derivatives thereof; benzyl sulfenyl halide and alkyl derivatives thereof; cyclohexane sulfenyl halide, and cyclopentane sulfenyl halide.

After the alcoholate and the sulfenyl chloride or sulfenyl bromide have reacted, the reaction product can be recovered from the reaction medium. In one method of recovery, the reaction mixture is first washed with water to effect removal of water-soluble salts, such as sodium chloride when a sodium alcoholate is employed. The solvent is distilled from the remaining mixture and the product can be purified by distillation, crystallization, or other known means.

Among the uses of the thiosulfenates of the invention, there are included uses as rubber compounding ingredients and as lachrymators.

The compounds of the invention are lachrymatory in the pure form, but are best employed by preparing under pressure a solution in a suitable propellant. A 5 to 15 percent solution of the thiosulfenate can be prepared under pressure in propane and charged into an aerosol bomb, or into a fracturable bomb. Alternatively, a 5 to 15 weight percent solution can be prepared under pressure in one of the fluorinated refrigerant type of propellants, such as dichlorodifluoromethane. Particularly suitable is about a 50-50 weight percent mixture of dichlorodifluoromethane and trichlorofluoromethane, charged to either an aerosol bomb or a fracturable bomb.

The compounds are also useful as a warning odorant for household gas. Approximately 0.002 percent of the thiosulfenate in LPG (e.g., propane) is satisfactory.

*Example I*

In a specific example methyl tert-butylthiosulfenate was prepared. Sodium methoxide was prepared by adding 92 grams of sodium metal to 750 ml. of absolute methanol which was maintained at the boiling point by refluxing. The resulting alcohol solution containing 4 moles of sodium methoxide was used for reaction with the tert-butyl sulfenyl chloride in pentane solution.

The tert-butyl sulfenyl chloride was prepared by reaction of 2 moles of chlorine (142 g.) with 2.2 moles di-tert-butyl disulfide (3.91 g.). The disulfide was dissolved in 3000 ml. of normal pentane which was contained in a 5-liter, glass vessel equipped with an inlet tube for chlorine, condenser, stirrer and thermometer. The solution was heated to the boiling point at atmospheric pressure, the temperature being about 36° C. The chlorine gas was bubbled into the solution over a 15-minute interval. The resulting pentane solution containing about 4 moles of tert-butyl sulfenyl chloride was subsequently reacted with the alcoholate as described below.

All of the sodium methoxide solution was added rapidly (about 5 minutes) to the sulfenyl chloride solution. The temperature of the reaction was maintained at about 36° C. by reflux of the solvent during the mixing period. As the reaction proceeded, salt crystallized from the reaction mixture.

To recover the product, about 500 ml. of water was added to the reaction mixture. This effected separation of the oil (pentane) phase, and most of the salt dissolved in the aqueous (water and alcohol) phase. This initial aqueous phase was further extracted with pentane (500 ml.), and this pentane was combined with the oil phase. The pentane solution was further washed with water to effect removal of salt.

The pentane was stripped from the solution by distillation, and the resulting product was distilled at a pressure of 25 mm. and a reflux ratio of 5 to 1 so as to yield fifteen cuts. The first two cuts which weighed a total of 20.3 g. and the last five cuts which weighed a total of 99.4 g. were put aside and cuts 3 through 10 weighing a total of 186.2 g. were combined. These middle cuts, (3 through 10) were obtained while the kettle temperature was in the range of about 71 to 95° C. and the head temperature was 60.5 to 62° C. at 25 mm. Hg absolute pressure. The pressure was measured at the head of the condenser. The index of refraction, $n_D^{20}$, for these cuts was between 1.4815 to 1.4838.

The cuts 3 through 10 described above were combined and this sample was combined with two other fractions prepared in a similar manner from a similar reaction and having similar physical properties. These combined lots were redistilled in order to obtain a high purity product for analysis. The distillation was conducted as previously described. A middle fraction having an index of refraction, $n_D^{20}$, of 1.4822, which was obtained when the head temperature was 60° C. at 25 mm. Hg absolute pressure and the kettle temperature was 70.5° C., was analyzed chemically, by infrared and mass spectrometer procedures.

The composition found by analysis and calculated for the methyl tert-butylthiosulfenate ($C_5H_{12}OS_2$) was as follows:

| Element | Percent by Weight | |
|---|---|---|
| | Found | Calculated |
| Carbon | 39.2 | 39.5 |
| Hydrogen | 7.9 | 7.9 |
| Sulfur | 40.0 | 42.1 |
| Oxygen (by diff.) | 12.9 | 10.5 |

The infrared spectra confirmed the presence of the tert-butyl group, the —C—O— group and the —S—S— group. Thus, the infrared data and the elemental analysis indicated that the major component has the structure methyl-tert-butylthiosulfenate which is represented by the formula

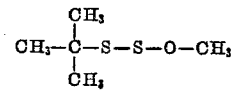

The computed molecular weight for this compound is 152.1. The value obtained by the mass spectrometric procedure gave a parent peak of 152 and hence also confirmed the structure of the compound.

The product methyl-tert-butylthiosulfenate was extremely lachrymatory.

*Example II*

Sodium methoxide and tert-butylsulfenyl chloride were prepared following the same procedure as in Example I except only half of the amounts of each reactant involved was used, as well as only half of the amounts of solvent.

The sulfenyl chloride so prepared was added over a 40-minute period to the sodium methoxide solution while vigorously agitating the reaction mixture. The orange-yellow color of the sulfenyl chloride disappeared rapidly. After addition of the sulfenyl chloride solution, the reaction mixture was stirred a few minutes and then 500 ml. of water was added to dissolve the sodium chloride which had precipitated during the reaction period. The phases were separated and the oil phase was washed with water. Most of the pentane was removed from the oil phase by distillation at atmospheric pressure. A packed column was employed and the pot was heated to about 95° C. at atmospheric pressure.

The product, amounting to 278.4 g. was then separated by distillation into 17 separate cuts. The boiling point and the volume of these cuts are summarized in the tabulation bleow.

| Cut No. | Boiling Point Range, °C. | Total Volume, ml. |
| --- | --- | --- |
| 1 | 36–40 | 26 |
| 2–7 | 40–109 | 60 |
| 8–14 | 109–112.5 | 175 |
| 15–16 | 112.5–103 | 20 |
| 17 | About 60 | 12 |

Upon completion of the distillation summarized above, there remained 30.7 grams of kettle bottoms. The yield was about 83.3 percent.

Center cut number 9 obtained from the distillation was analyzed for sulfur content within 6 hours after preparation of the product. The analysis showed 25.4 percent sulfur as compared with a value of 26.6 percent for the calculated value for methyl tert-butyl sulfenate having the formula $C_4H_9SOCH_3$.

From a comparison of Example II with Example I it will be seen that the overall ratio of reactants was the same in the two examples, but that there was present in the reaction mixture during the reaction an excess of the sodium methoxide in Example II since the sulfenyl chloride was added to the entire amount of sodium methoxide in increments during the reaction. Thus, it is seen that the product of the invention, in this case, methyl tert-butylthiosulfenate is obtained when there is at least 1 gram mole of the sulfenyl halide in the reaction mixture for each gram equivalent weight of the alcoholate, but not when there is present in the reaction mixture an excess over this amount of the alcoholate. It is apparent, also, that one convenient method for providing the desired ratios of reactants in the reaction mixture is to add the sodium methoxide to the sulfenyl halide.

*Example III*

A 10 weight percent solution of methyl tert-butylthiosulfenate in a 50–50 weight percent mixture of the dichlorodifluoromethane and trichlorofluoromethane is prepared under pressure and charged to a metal aerosol bomb. The bomb is placed in a closed room with the discharge button depressed so that the aerosol mixture sprays into the room. The room is quickly rendered lachrymatory to humans and animals.

The term "alkali metals" as used herein has its common meaning and means the metals lithium, sodium, potassium, rubidium, and cesium. The term "alkaline earth metals" means the metals calcium, strontium and barium, as is commonly understood.

As will be evident to those skilled in the art, various modifications of this invention can be made or followed in the light of the foregoing disclosure and discussion without departing from the spirit or scope of the disclosure or from the scope of the claims.

I claim:

1. A method which comprises reacting a sulfenyl halide having the formula RSX with an alcoholate of the formula $M(OR')_n$, there being in the reaction mixture at least 1 gram mole of said sulfenyl halide for each gram equivalent weight of said alcoholate in the reaction mixture, wherein each of R and R' is an alkyl radical, X is selected from the group consisting of chlorine and bromine radicals, M is selected from the group consisting of alkali metal, radicals and alkaline earth metal radicals, and $n$ equals the valence of M, and thereby producing a thiosulfenate of the formula R—S—S—O—R', the sum of the number of carbon atoms in R and R' being no more than 20.

2. A method which comprises reacting a sulfenyl halide having the formula RSX with an alcoholate of the formula $M(OR')n$ there being in the reaction mixture at least one gram mol of said sulfenyl halide for each gram equivalent weight of said alcoholate in the reaction mixture, wherein R is a tertiary alkyl radical, R' is an alkyl radical, the sum of the carbon atoms in R and R' being no greater than 20, X is selected from the group consisting of chlorine and bromine radicals, M is selected from the group consisting of alkali metal radicals and alkaline earth metal radicals, and $n$ equals the valence of M, and thereby producing a thiosulfenate of the formula R—S—S—O—R'.

3. A method which comprises reacting a sulfenyl halide having the formula RSX with an alcoholate of the formula $M(OR')_n$, there being in the reaction mixture at least one gram mol of sulfenyl halide for each gram equivalent weight of said alcoholate in the reaction mixture, wherein R is a tertiary alkyl radical containing from 4 to 12 carbon atoms, R' is an alkyl radical, the sum of carbon atoms in R and R' is not greater than 20, X is selected from the group consisting of chlorine and bromine radicals, M is selected from the group consisting of alkali metal radicals and alkaline earth metal radicals, and $n$ equals the valence of M, and thereby producing a thiosulfenate of the formula R—S—S—O—R'.

4. A method which comprises reacting a sulfenyl halide having the formula RSX with an alcoholate of the formula MOR', there being in the reaction mixture at least one gram mol of said sulfenyl halide for each gram equivalent weight of said alcoholate in the reaction mixture, wherein each of R and R' is an alkyl radical and R' contains from 1–8 carbon atoms, the sum of the carbon atoms in R and R' is no more than 20, X is selected from the group consisting of chlorine and bromine radicals, M is an alkali metal radical, and thereby producing a thiosulfenate of the formula R—S—S—O—R'.

5. A method which comprises reacting a sulfenyl halide having the formula RSX with an alcoholate of the formula MOR', there being in the reaction mixture at least one gram mol of said sulfenyl halide for each gram equivalent weight of said alcoholate in the reaction mixture, wherein R is a tertiary alkyl radical containing from 4 to 12 carbon atoms, R' is an alkyl radical, the sum of carbon atoms in R and R' is not over 20, X is selected from the group consisting of chlorine and bromine radicals, M is an alkali metal radical, and thereby producing a thiosulfenate of the formula R—S—S—O—R'.

6. A method which comprises reacting a sulfenyl halide having the formula RSX with an alcoholate of the formula MOR', there being in the reaction mixture at least one gram mol of said sulfenyl halide for each gram equivalent weight of said alcoholate in the reaction mixture, wherein R is a tertiary alkyl radical containing from 4 to 12 carbon atoms, R' is an alkyl radical containing from 1 to 8 carbon atoms, X is selected from the group consisting of chlorine and bromine radicals, M is an alkali metal radical, and thereby producing a thiosulfenate of the formula R—S—S—O—R'.

7. A method according to claim 6 wherein during the course of the reaction the alcoholate is added to the total amount of the sulfenyl halide.

8. A method which comprises recting tert-butylsulfenyl chloride with an alkali metal alcoholate of methyl alcohol, there being in the reaction mixture during said reaction at least one gram mol of said sulfenyl halide for each gram equivalent weight of said alcoholate in the reaction mixture, and thereby producing methyl tert-butylthiosulfenate.

9. An alkyl tert-alkylthiosulfenate of the formula R—S—S—O—R' wherein R is a tertiary alkyl radical containing from 4 to 12 carbon atoms and R' is an alkyl radical containing from 1 to 8 carbon atoms.

10. An alkyl tert-butylthiosulfenate having the formula
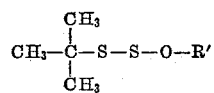
where R' is an alkyl radical containing from 1 to 8 carbon atoms.
11. Methyl tert-butylthiosulfenate having the structural formula
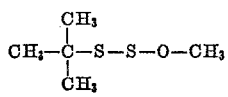
References Cited in the file of this patent
UNITED STATES PATENTS
2,508,745   Cavallito et al. _____ May 23, 1950
OTHER REFERENCES
Chem. Abstracts, vol. 39, No. 24, Dec. 20, 1945, pp. 5897 and 5898.
Kharasch et al.: Chemical Reviews, vol. 39 (1946) p. 324.